Feb. 23, 1932.                F. W. GAY                1,846,030
                           NETWORK REACTOR
                          Filed July 10, 1931
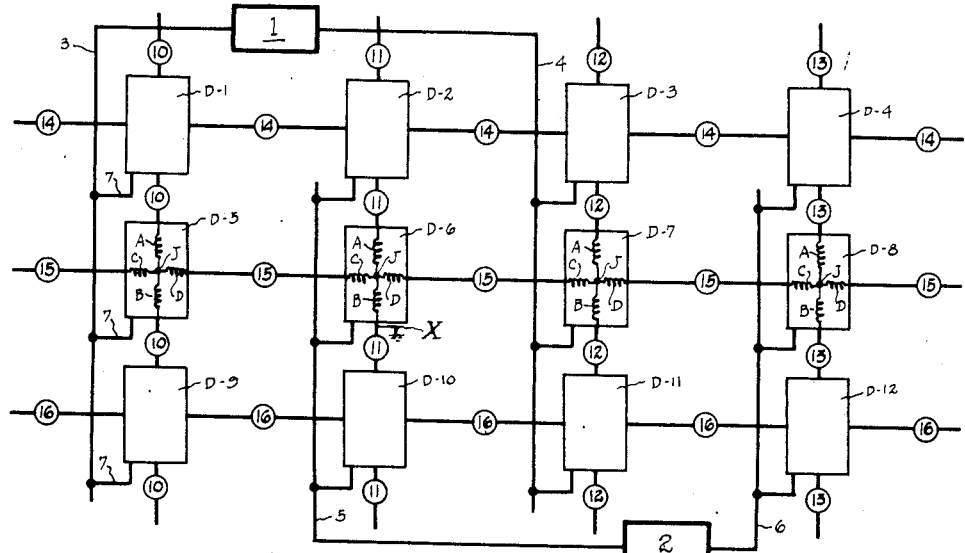
Fig. 1
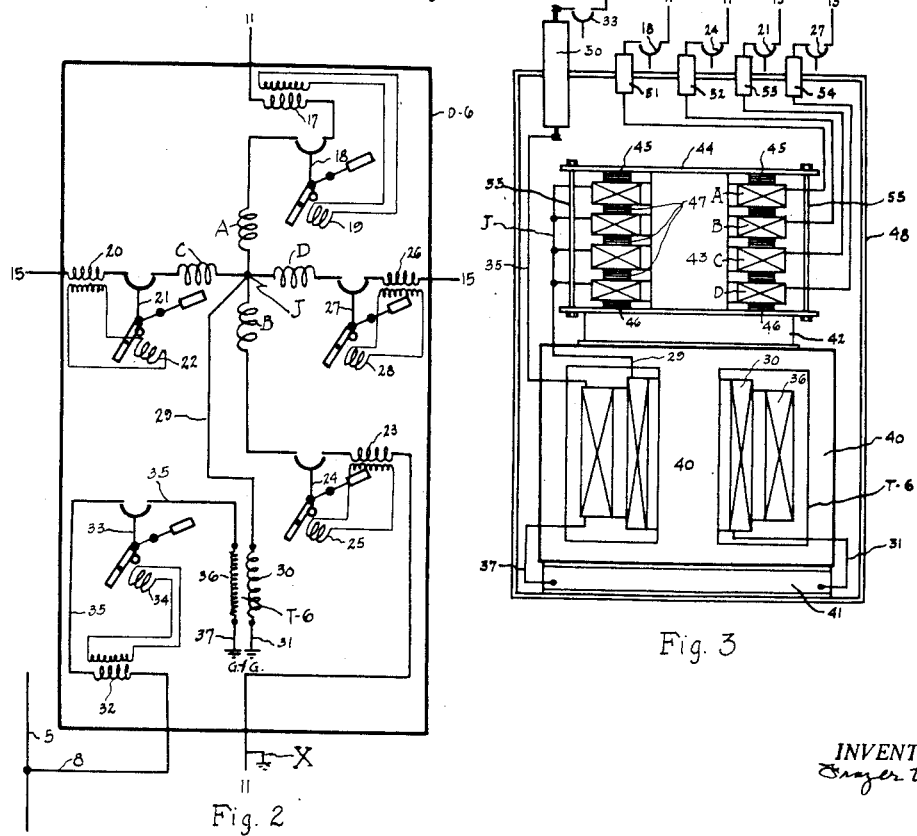
Fig. 2
Fig. 3
INVENTOR.
Frazer W. Gay Patented Feb. 23, 1932

1,846,030

UNITED STATES PATENT OFFICE

FRAZER W. GAY, OF NEWARK, NEW JERSEY

NETWORK REACTOR

Application filed July 10, 1931. Serial No. 549,848.

This invention relates to a novel method of limiting fault currents in power distribution systems and more particularly to that form of power distribution system commonly known as a primary network.

Heretofore it has been customary to solidly connect each phase wire of two 4,150 volt circuits at every point of crossing. Each circuit leaving a junction point is controlled by a circuit breaker. Power is fed into the junction point of each phase by the corresponding phase of a three phase transformer. Each such three phase transformer generally has its secondary solidly connected (without a circuit breaker) at the phase wire junction points and its primary is controlled by a circuit breaker.

It is an object of my invention to limit the maximum current that may flow from any junction point along a short circuited feeder to such a value that it may be interrupted by a small and inexpensive circuit breaker.

It is a further object of this invention to limit the current that may flow to a short circuit by novel reactor means capable of introducing a relatively very great reactance to current flowing into a short circuited feeder wire, while at the same time constructing and arranging the coils of said current limiting reacting means so that substantially no impedance is opposed to the flow of the balanced currents normally flowing in any said feeder to or from its junction points.

A further object of this invention is to allow certain of the power transformers feeding my novel network to be withdrawn from service i. e., to have their primary circuit breakers opened without introducing excessive reactance to the flow of current into those feeder circuits adjacent to the withdrawn transformers.

It is a further object of this invention to connect a primary network to dual sources of power by transmission lines and to interpose reactance means between each such source of power and the network instantly operative to interpose a relatively very great reactance to the flow of current from said transmission lines to a faulty feeder in said network, and operative to interpose a minimum reactance to the balanced flow of power between said sources of power over said transmission lines and through said network whereby said sources of power may be effectively maintained in synchromism when connected to said network.

It is a further object of this invention to connect four separately insulated coils in series circuit in the four corresponding phase wires of four three phase feeder circuits connected to receive power from a three phase transformer bank and to so adjust the turns in the four coils and arrange them concentrically in mutually inductive relation that when carrying normal load their combined magnetomotive force is zero.

In the preferred arrangement four separately insulated coils are closely interlaced. One pair of said coils being oppositely wound to the other pair. Corresponding ends of these four coils are connected to the output end of one phase winding of a power transformer feeding a network and constitute the junction point of said phase. The other four ends of said coils are connected each to a corresponding phase wire of one of the out going 4,150 volt feeders. Coils wound in opposite directions with respect to the junction point are preferably connected to feeder wires going in opposite directions.

It will be obvious to one skilled in the art that if each of said four feeder wires carries an equal current, there will be equal currents in the four closely interlaced reactor coils, and since two of these reactor coils are wound oppositely to the remaining two their magnetomotive forces will cancel and there will be substantially no magnetic flux passing through the common area embraced by all of said coils, in other words, said four coils will offer a minimum impedance to such a balanced flow of current.

On the other hand, if a fault should develop on one said phase wire there will be a rush of current from the transformer through the coil connected to said phase wire and there will be a back feed current flowing toward the junction point in those two coils which are oppositely wound to that coil carrying the heavy current from the transformer. These back feed currents will join with the transformer current at the junction point and flow with the transformer current through the coil connected to the faulty feeder circuit wire. The magnetomotive forces of these three currents will be additive and a very dense magnetic flux will link the three coils and induce a relatively great counter E. M. F. to oppose the flow of said currents.

The fourth coil which is wound in the same direction as the coil connected to the faulty feeder circuit wire will carry a substantial current and its magnetomotive force will be opposed by the much greater magnetomotive force of the other three coils. This current will flow toward the junction point in one of said similarly wound coils and away from the junction point in the other of said similarly wound coils. Said novel reactive means will therefore act to greatly limit the current flowing from the transformer adjacent the fault into the fault and to still further reduce the current flowing from two of the feeder circuits into the fault, while a very substantial current will flow through the reactive means from the fourth nonfaulty feeder circuit. The current in this fourth (nonfaulty feeder) will of course be limited by the next adjacent reactive means in this feeder.

Other objects of this invention, not at this time more particularly enumerated will be clearly understood from the following description of the same.

The invention is clearly illustrated in the accompanying drawings, in which:—

Fig. 1 is a diagrammatic representation of a plurality of feeders, (running in one direction) crossing and joined to a plurality of other feeders, (running at right angles to the first feeders) to form a network.

Fig. 2 is a diagrammatic representation of one of the power feeding devices D—6 shown in Fig. 1.

Fig. 3 is a cross section of the transformer T—6 and the reactance coils A, B, C, D shown in Fig. 2.

In Fig. 1; 10, 11, 12, and 13 represent single phase (say) 2400 volt feeders running in one direction and crossing other single phase 2400 volt feeders 14, 15, 16 running at right angles. Feeders 10, 11, 12, and 13 are electrically connected to feeders 14, 15, and 16 at their junction points and devices D—1, D—2, D—3, ... D—12 are located each at a junction point. Power is shown fed to the network over single phase high voltage (say 13,200 volts) feeders as 3 and 4 receiving power from generating station 1 and high voltage feeders 5 and 6 receiving power from generating station 2.

Fig. 2 shows more in detail the device D—6 located at the junction point of feeder 11 and feeder 15.

It is to be understood that devices D—1 to D—12 respectively are in every respect similar in construction to device D—6.

2400 volt feeder 11 is shown entering the junction device D—6 through the primary of current transformer 17, passing through circuit breaker 18 and through coil A to its junction with feeder 15 at point J, it then passes out of device D—6 through reactance coil B, circuit breaker 24 and the primary of current transformer 23.

2400 volt feeder 15 enters device D—6 through the primary of current transformer 20, passes through circuit breaker 21 and reactance coil C to the junction point J where it joins feeder 11. It then passes through reactance coil D, circuit breaker 27 and out of device D—6 through the primary of current transformer 26. The secondaries of current transformers 17, 20, 23 and 26 are connected to the trip coils 19, 22, 25, and 28 of circuit breakers 18, 21, 24, and 27 respectively.

The secondary 30 of the transformer T—6 has one terminal connected by lead 29 to the junction point J of feeders 11 and 15. The other terminal of winding 30 is shown connected by lead 31 to ground G. The primary 36 of transformer T—6 has one terminal connected by high voltage lead 35 through circuit breaker 33, the primary of current transformer 32 and lead 8 to high voltage transmission circuit 5. The circuit 5 receives its power from generating station 2 (see Fig. 1). The secondary of current transformer 32 is connected to the trip coil 34 of circuit breaker 33.

Fig. 3 shows a cross section of a tank 48 containing the transformer T—6 and the reactance coils A, B, C, D shown in Fig. 2. The coils 30 and 36 of transformer T—6 are interlaced by a common magnetic circuit 40 which in turn is mounted on a metal base 41 and supports a metal cap 42. The high voltage coil 36 is solidly grounded by lead 37 to metal base 41 and has its other lead connected to high voltage bushing 50. High voltage bushing 50 is connected to high voltage circuit breaker 33. Low voltage coil 30 is connected at one end to ground by lead 31 and has its other end connected by lead 29 to junction point J of coils A, B, C, and D. Coils A, B, C, and D are spaced apart by insulating washers 47 and are mounted on a common core 43. They are firmly clamped by bolts 55 between the transformer cap 42 and the clamp plate 44. Starting from the junction terminal J, coils A and C are oppositely wound from coils B and D. Coils A, B, C, and D are connected to low voltage terminals 51, 52, 53, and 54 at their outer ends and to the common junction point wire J at their inner ends.

The operation of this device under normal load conditions is as follows.

Power is fed into the junction point through the device located at said points as at J, Fig. 2. In Fig. 2 power is shown as being received by the primary of transformer T—6 through current transformer 32 and circuit breaker 33 from station 2 and being returned to station 2 through the ground G—1. The power induced in secondary winding 30 is fed to the junction point J by lead 29 and if the load is substantially balanced, as may usually be arranged, divides into four equal currents, one equal part passing through coil A, another through coil B, another through coil C, and a fourth equal part through coil D.

By referring to Fig. 3 it will be seen that since coils B and D are wound oppositely to coils A and C the magnetomotive forces produced by the current in coils B and D will be equal and opposite to the magnetomotive forces produced by the currents in A and C, and there will therefore be no magnetic flux in the core 43 that will link coils A, B, C, and D in common; in other words, the reactance imposed by the coils A, B, C, and D to balanced currents flowing through them will be exceedingly small i. e., that produced by the leakage flux flowing around each individual coil separately. It will be seen also that if the circuit of high voltage feeder 5 should be interrupted, as by disconnecting high voltage line 5 at the power house 2, it will be necessary for 2400 volt feeder 11 to receive its power from the adjacent volt feeders 10 and 12. Now if again the loads are balanced, current will flow toward feeder 11, for instance toward J in the device D—6 Fig. 2 through coils C and D and will flow out on feeder 11 through coils A and B. If the loads are balanced the magnetomotive forces in coils C and D will mutually cancel each other since we have seen these coils are oppositely wound, also the magnetomotive forces produced by currents flowing in coils A and B will mutually cancel each other and again there will be no magnetic flux in the core 43 Fig. 3 and the reactance opposing such currents will be very small.

If on the other hand, a fault should occur on any line tending to produce a great unbalanced current as for instance a ground at X on line 11 Figs. 1 and 2 the result will be quite different. In this case a very heavy current will flow from the fault at X into the ground, return through the ground and through lead 31, pass through transformer T—6, secondary 30 to the junction point J and through the coil B back to the ground fault at X. The great impedance drop in transformer T—6 will greatly reduce the voltage of the junction point J, since the transformer T—6 will drop voltage due to its impedance to the relatively great current flowing to the fault at X. Since the point J is at low potential, say 50 or 60 per cent of normal, there will be a rush of current toward J through the coils A, C, and D. Since coils A and C are oppositely wound and the current is toward J in coils A and C and away from J in coil B the magnetomotive forces produced by the currents in these three coils will be additive and will produce an enormous magnetic flux in core 43 common to coils A, B, and C. The coil B carries all the currents flowing through A, C, and D as well as the currents flowing from the transformer secondary coil 30. The reactance drop across coil B may be expected to be on the order of 60 per cent of normal, while that across coils A and C may be on the order of 30 per cent of normal. On the other hand a current in coil D since it is flowing around core 43 in an opposite direction to the current in coils A, B, and C will produce magnetomotive force opposing the magnetomotive force produced by the currents in coils A, B, and C and reactance opposing the current in coil D will therefore be much less than that of the other three coils A, B, and C, possibly on the order of 20 per cent of normal voltage. It therefore becomes evident that my novel network reactance device offers a minimum impedance to balanced currents which may normally be expected to flow in a well designed network and offers a very great reactance to the unbalanced current flowing to fault at any point in such a network.

It will be evident to one skilled in the art that the current transformers, as for instance 23 Fig. 2, may be so wound that in conjunction with their connected trip coils they will trip a faulty circuit (as for instance the faulty circuit 11 connected to the ground X) by reason of the very heavy current flowing in said circuit as through the current transformer 23. These current transformers and connected trip coils will not be caused to function to open a circuit breaker by the lesser currents flowing toward the junction point as J. It is also evident that the current transformers in the high voltage lines as at 32 Fig. 2 can be wound and connected to the trip circuits as 35 Fig. 2 so as to operate in case of a short circuit at the transformer terminals but not to operate the circuit when the current flowing is limited by the higher reactance of my novel current limiting device as D—6 Fig. 2.

As many changes could be made in the above construction and many apparently widely different embodiments of this invention could be made thereof, it is intended that all matter contained in the above description or shown in the accompanying drawings shall be interpreted as illustrative and not in a limiting sense.

What is claimed is:—

1. A power transmission network comprising a first plurality of transmission lines, a second plurality of transmission lines, each of said first transmission lines crossing said second plurality of transmission lines and certain of said first plurality of transmission lines being electrically connected to certain of said second plurality of transmission lines at junction points where they cross; and current limiting reactor means at a junction point, said reactor means comprising a plurality of coils, each of said coils being respectively connected in a respective circuit leaving said junction point, said coils being so inductively associated and connected that balanced currents flowing from one of said transmission lines through the two connected coils toward said junction point and dividing equally through two other coils to flow out on another of said transmission lines are opposed by a minimum low reactance offered by said coils to said balanced currents, while an unbalanced current flowing through one said coil away from said transmission point is opposed by a maximum and relatively great reactance offered to said unbalanced current in said coil.

2. A power transmission network comprising a first plurality of transmission lines, a second plurality of transmission lines, each of said first transmission lines crossing said second plurality of transmission lines and certain of said first plurality of transmission lines being electrically connected to certain of said second plurality of transmission lines at junction points where they cross, and current limiting reactor means at a junction point, said reactor means comprising a plurality of coils, each of said coils being respectively connected in a respective circuit leaving said junction point, said coils being so inductively associated and connected that balanced currents flowing from one of said transmission lines through the two connected coils toward said junction point and dividing equally through two other coils to flow out on another of said transmission lines are opposed by a minimum low reactance offered by said coils to said balanced currents while an unbalanced current flowing through one said coil away from said transmission point is opposed by a maximum and relatively great reactance offered to said unbalanced current in said coil and a transformer secondary connected to feed its induced power into said network at one said junction point.

3. A power circuit arrangement comprising a power transformer secondary phase winding and four corresponding transmission phase lines, said secondary phase winding being connected to feed its induced power to said four corresponding transmission phase lines and a plurality of coils, each of said coils being respectively connected in series in a respective one of said connected phase lines, and a common magnetic circuit for said four coils, said four coils being so connected in said power circuit arrangement and assembled with respect to said common magnetic circuit that balanced currents flowing from said power transformer secondary phase winding through said four coils to said four transmission circuits meet with substantially no reactance.

4. A power circuit arrangement comprising, a power transformer secondary phase winding and four corresponding transmission phase lines, said secondary phase winding being connected to feed its induced power to said four corresponding transmission phase lines and a plurality of coils, each of said coils being respectively connected in series in a respective one of said connected phase lines, and a common magnetic circuit for said four coils, said four coils being so connected in said power circuit arrangement and assembled with respect to said common magnetic circuit that balanced currents flowing from said power transformer secondary phase winding through said four coils to said four transmission circuits meet with substantially no reactance, and an unbalanced current from said power transformer secondary phase winding through one of said coils is opposed by a relatively great reactive drop in said coil.

5. A reactance device comprising four equal turn coil groups, all said coil groups being closely spaced mechanically so as to have a common magnetic path for interlacing magnetic flux; a common junction point to which said four coil groups are connected, the adjacently located coil groups being oppositely wound with respect to said common junction point.

6. A power transmission network comprising a plurality of transmission lines, said transmission lines having junction points where crossing transmission lines are electrically connected; coils connected in series in each phase wire of said crossing transmission lines before and after a junction point, said two coils in each transmission phase wire at any junction point being closely spaced mechanically and being oppositely wound with respect to said junction point, a power source feeding current to each of such junction points on one transmission line, and a different power source feeding current to junction points on the adjacent two parallel transmission lines.

In testimony that I claim the invention set forth above I have hereunto set my hand this 9th day of July 1931.

FRAZER W. GAY.